United States Patent [19]
Torres

[11] Patent Number: 5,954,509
[45] Date of Patent: *Sep. 21, 1999

[54] EDUCATIONAL DEVICE

[76] Inventor: Anthony Torres, 4985 W. 8th St., Greeley, Colo. 80634

[ * ] Notice: This patent is subject to a terminal disclaimer.

[21] Appl. No.: 08/310,968

[22] Filed: Sep. 23, 1994

[51] Int. Cl.⁶ .............................. G09B 1/30; G09B 19/02
[52] U.S. Cl. ......................... 434/191; 434/188; 434/209
[58] Field of Search .................................. 434/188, 192, 434/209, 348, 191, 193; 283/44

[56] References Cited

U.S. PATENT DOCUMENTS

| | | | |
|---|---|---|---|
| 2,560,130 | 7/1951 | Russo | 434/192 |
| 2,600,084 | 6/1952 | Svensson | 434/199 |
| 2,751,690 | 6/1956 | Cohen | 434/209 |
| 3,172,599 | 3/1965 | Passerini | 434/209 |
| 3,405,460 | 10/1968 | Michaelson | 434/192 |
| 3,432,943 | 3/1969 | Merkel | 434/199 |
| 3,531,877 | 10/1970 | Miller | 434/188 |
| 3,541,702 | 11/1970 | Cohen | 434/209 |
| 3,768,177 | 10/1973 | Thomas | 434/192 |
| 4,185,401 | 1/1980 | Smathers | 434/199 |
| 5,110,295 | 5/1992 | Concra | 434/88 |

*Primary Examiner*—Paul J. Hirsch
*Attorney, Agent, or Firm*—David S. Woronoff

[57] ABSTRACT

An educational device having a base page, which may be transparent and multiple intervening transparent pages and a structure to hold the multiple intervening transparent layers in registration in which the base layer has a set of problems which are modified by each succeeding overlying layer and in which the numbers are formed by using seven segment blocks similar to those used by light emitting diodes or liquid crystal displays for forming and modifying the numbers and the indication of the operation to be performed if formed by using one to four segment blocks.

9 Claims, 3 Drawing Sheets

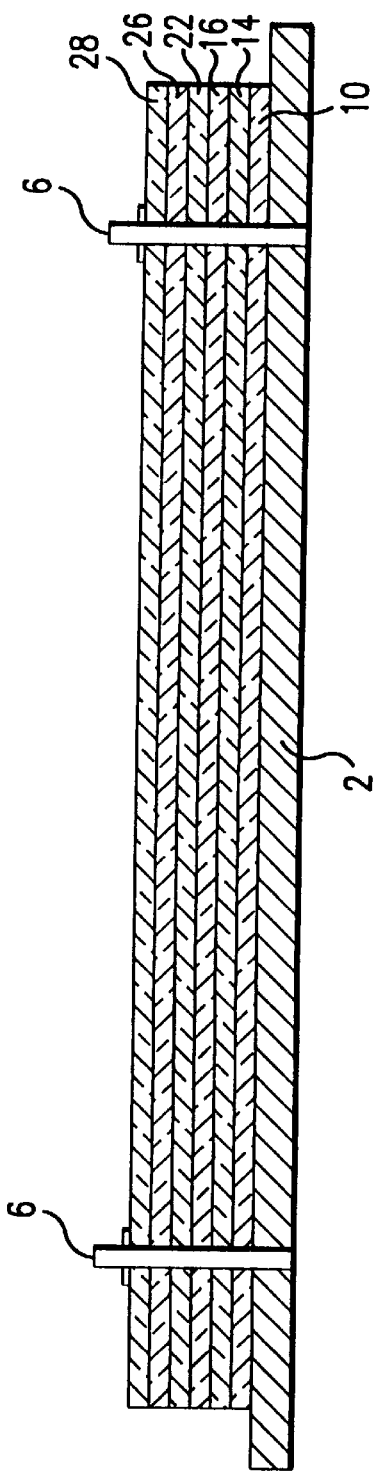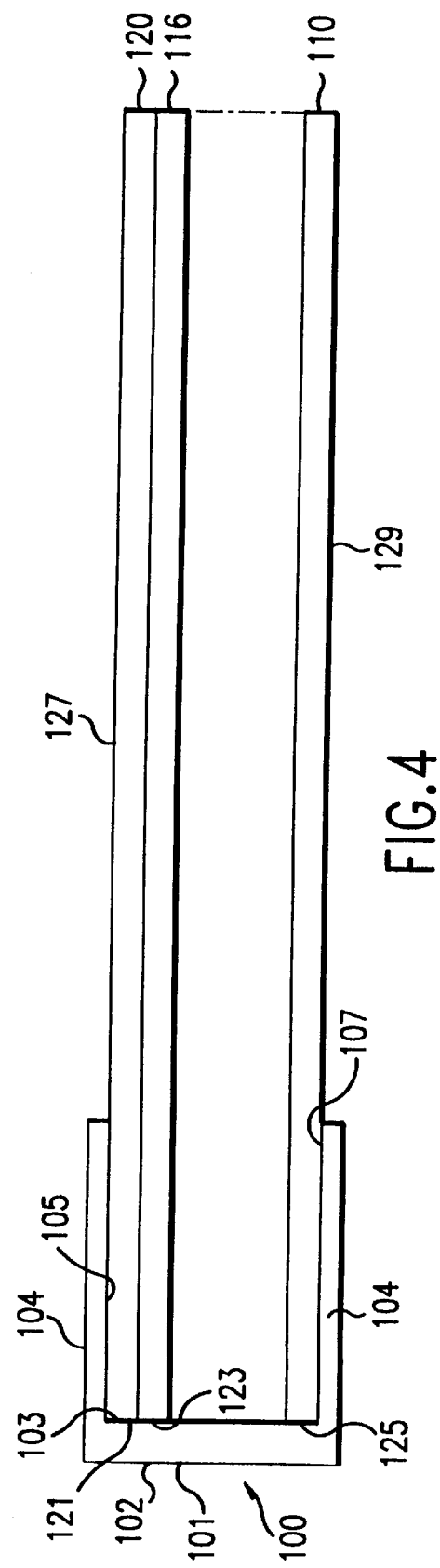

EDUCATIONAL DEVICE

BACKGROUND OF THE INVENTION

The present invention relates to the field of educational devices for teaching mathematics. In particular the invention relates to that part of the educational teaching device field in which interleaved transparent sheets are used to present a multiplicity of mathematics problems in which each overlay or underlay has a different set of problems for the student to solve. Until the present invention, no known device used the underlying figures to construct the mathematics problem which is then modified by the overlying transparent sheet.

FIELD OF THE INVENTION

The present invention relates to the field of educational devices for teaching mathematics and more particularly to that part of the field which relates to the use of one or more transparencies held in registration by a frame in which the student can write on the transparency with a grease pencil or similar device and in which the writing can be erased by rubbing with a cloth or sponge.

DESCRIPTION OF THE PRIOR ART

The closest prior art known to the applicants are U.S. Pat. Nos. 2,751,690 and 3,541,702 both issued to J. G. Cohen AND U.S. Pat. No. 5,110,295 issued to Concra. The Concra patent shows an interleaved education device which employs a plurality of transparent sheets in which the sheets can be rearranged to show different patterns and in which the sheets can be used as a basis for tracing the patterns shown below the transparent sheet on which the tracing is to occur.

The two Cohen patents show books with covers which have intermediate leaves of transparent sheets which show in steps the solution to a particular mathematics problem such as division or multiplication. The '702 Cohen patent teaches the use of color coded printing hidden by an upper page. The Cohen patents require that the books be used from back to front.

SUMMARY OF THE INVENTION

The present invention teaches a novel educational device having a base page, which may be transparent and multiple intervening transparent pages and a structure to hold the multiple intervening transparent layers in registration in which the base layer has a set of problems which are modified by each succeeding overlying layer and in which the numbers are formed by using seven segment blocks similar to those used by light emitting diodes or liquid crystal displays for forming and modifying the numbers and the indication of the operation to be performed if formed by using one to four segment blocks.

BRIEF DESCRIPTION OF THE DRAWINGS

FIG. 3 shows a side view showing one embodiment of a binder system

FIG. 4 shows a side view showing a second embodiment of a binder system.

DESCRIPTION OF THE PREFERRED EMBODIMENTS

Figure 1:
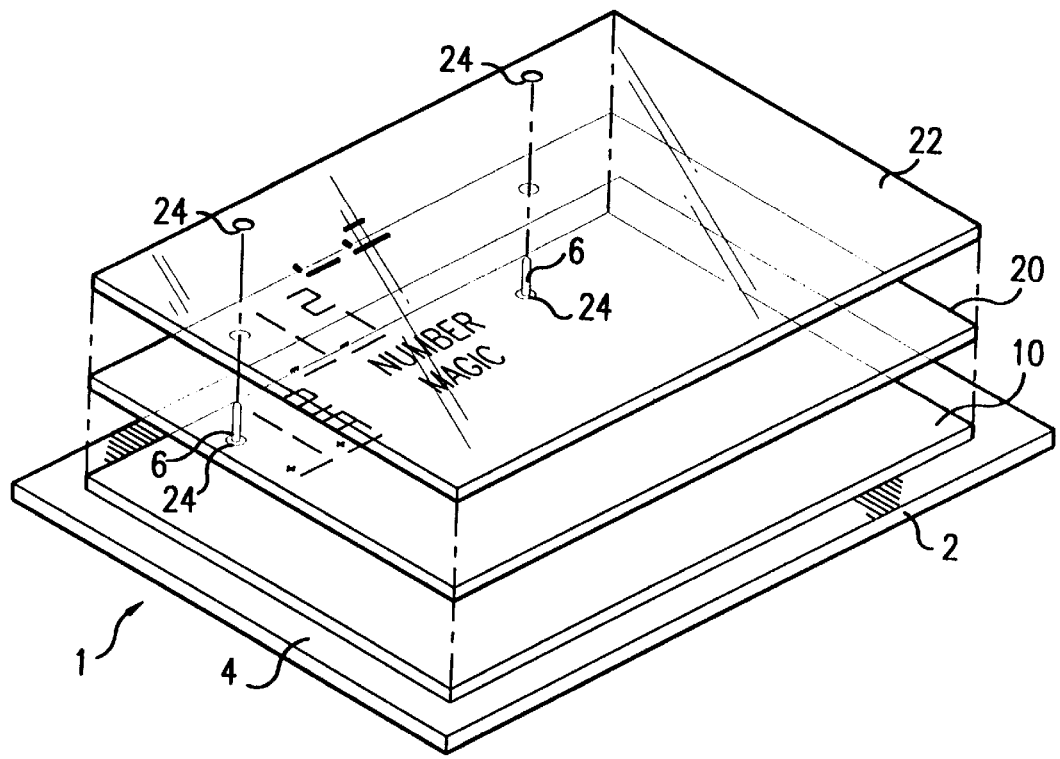
FIG. 1 shows an exploded view of the present invention with a first base sheet and two intermediate sheets for being loaded onto a common frame or binder.

FIG. 1 is an exploded view of one embodiment of the present invention shown generally by the number 1 in which a base 2 has edges 4 and vertical posts 6 which fit through apertures 24 formed in sheets 10, 20, 22. The sheets 10, 20 and 22 are in registration so that combinations of them will produce a pattern of mathematics problems shown in FIG. 2.

Figure 2:
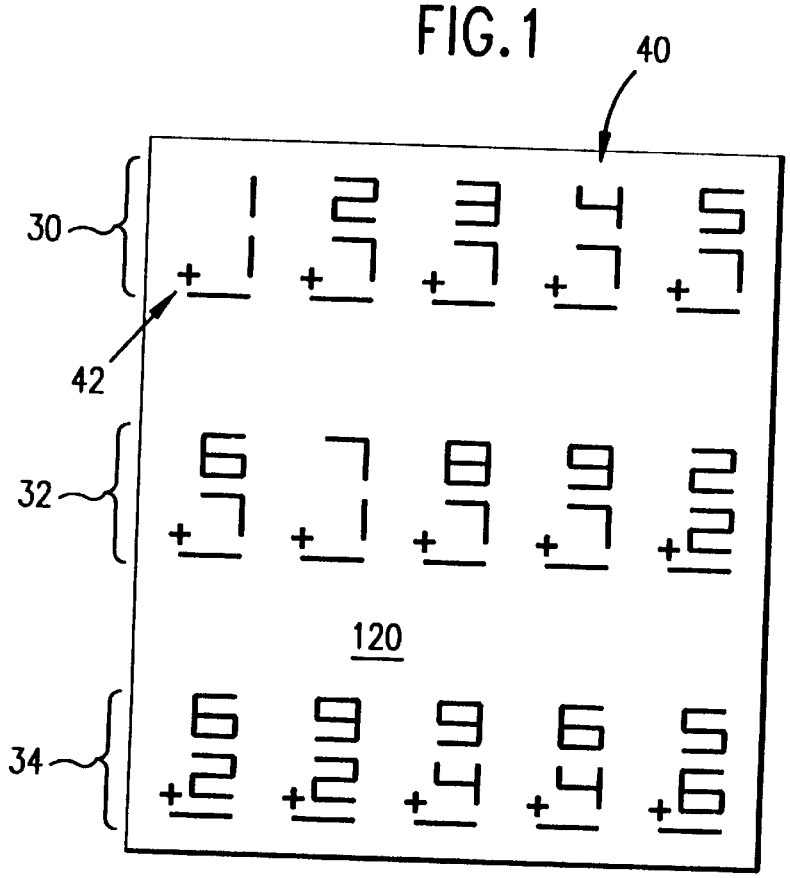
FIG. 2 is a top view of another embodiment of an intermediate sheet formed from a combination of sheets shown in FIG. 1.
Figure 6:
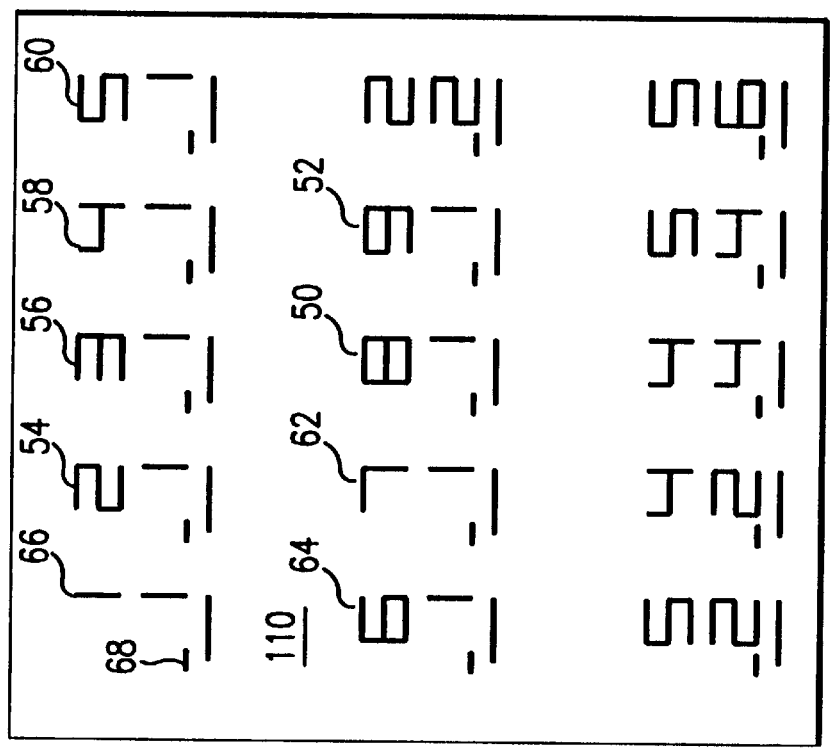
FIGS. 5 and 6 are top views of other embodiments of interleaves forming a part of the present invention.

FIG. 2 shows three arrays, 30, 32, 34 of addition problems which can be formed by the overlay of sheets such as shown in FIGS. 2 and 6. Each array consists of columns.

Each array consists of columns 40 and rows 42 properly aligned to produce a number of addition or subtraction problems.

FIG. 6 shows a sheet 110 (which could be transparent or opaque) on which the detail of numbers 1 through 9, 50, 52, 54, 56, 58, 60, 62, 64, and minus signs 68 are formed.

Figure 5:
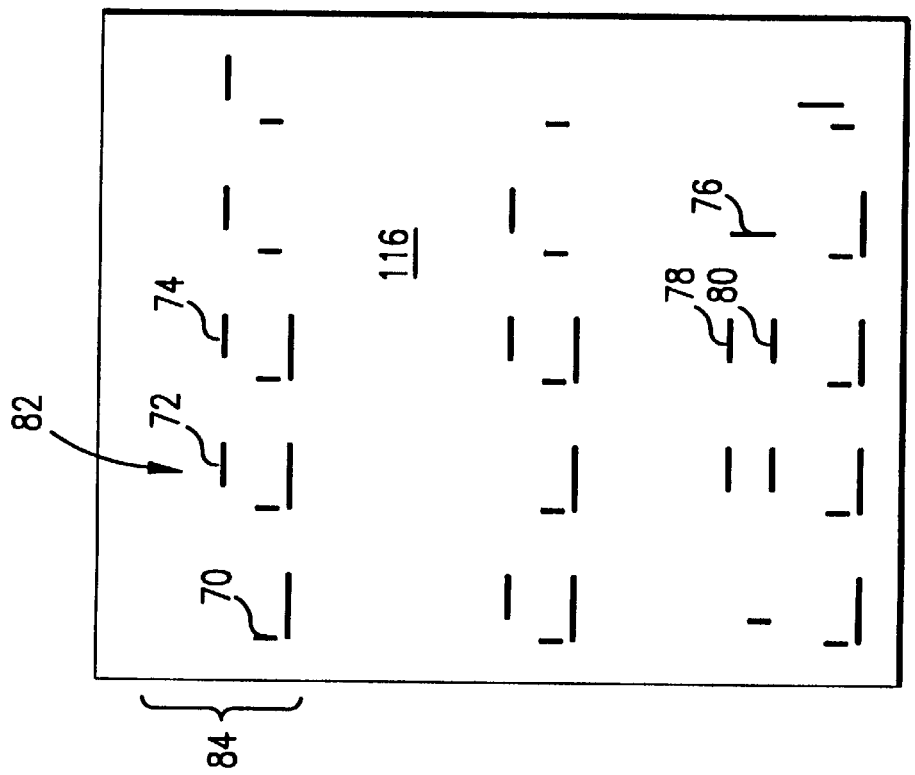

FIG. 5 shows a transparent (intermediate) sheet 116 having columns 82 and rows 84 of lines 70, 72, 74 which when in registration with a sheet similar to sheet 110 shown in FIG. 6 will produce a composite sheet shown in FIG. 2. FIG. 2 sheet 120 is the net of what an observer would see if sheets similar to 110 and 116 are properly overlaid and in registration.

The line segments shown in FIG. 2 mate with the line segments shown in FIG. 6 to produce the composite similar to that shown in FIG. 2.

FIG. 4 side view of a second embodiment of the registration system forming a part of the invention is shown generally by the number 100. A "U" shaped spring clip 101 has a rear support member 102 with an inner surface 103 which mates with rear edges 121, 123, 125 of sheets 120, 116, 110 respectively. The spring clip 101 has top and bottom member 104 which have inner surfaces 105 for engaging the top surface 127 of sheet 120 and the bottom surface 107 of sheet 120.

The embodiments of the present invention which have been shown and described are illustrative of the main principles of the invention but the following claims shall not be limited to the embodiments shown. The claims are intended to cover and do cover those variations of the invention which are apparent to those skilled in the art.

I claim:

1. An apparatus comprising:

a frame means for holding more than one leaf of a writing surface in registration;

a first non-transparent leaf for engagement by the frame means having numbers or parts of numbers formed thereon from a seven segment pattern;

a first transparent leaf for engagement by the frame means and overlying the first non-transparent leaf and in registration therewith;

the first non-transparent leaf has formed thereon numbers formed from the seven segment pattern; and, the first transparent leaf has lines formed thereon in the seven segment pattern which when held in registration by the frame means mate with the numbers formed on the first non-transparent leaf to modify the numbers on the first non-transparent leaf.

2. The device claimed in claim 1 wherein:

the first non-transparent leaf is a base leaf.

3. The device claimed in claim 1 wherein:

the first non-transparent leaf has formed thereon an indication of a mathematical operation to be performed.

4. The device claimed in claim 3 wherein the first transparent leaf has formed thereon line segment means in registration with the first non-transparent leaf which give further indication of mathematical operation to alter the indicated mathematical operation.

5. The device claimed in claim 1 wherein:

one or more additional transparent leaf members have lines in the seven segment pattern which when held in registration by the frame means mate with the numbers formed on the transparent leaf members below it to modify the numbers on the first non-transparent leaf member.

6. The device claimed in claim 3 wherein:

one or more additional transparent leaf members have lines in the seven segment pattern which when held in registration by the frame means mate with the numbers formed on the transparent leaf member below it to modify the numbers on the first non-transparent leaf member.

7. The device claimed in claim 1 including further:

a first base member;

two or more outwardly extending post members attached to the base member;

said leaf members having two apertures registered to permit said post members to pass therethrough.

8. The device claimed in claim 1 including further:

frame means formed of a "U" shaped resilient member for engaging the first non-transparent and first transparent leaf members.

9. The device claimed in claim 4 wherein:

one or more additional transparent leaf members have lines in the seven segment pattern which when held in registration by the frame means mate with the numbers formed on the transparent leaf member below it to modify the numbers on the lower transparent leaf member.

* * * * *